US011877571B1

(12) United States Patent
Alhuwaidi et al.

(10) Patent No.: US 11,877,571 B1
(45) Date of Patent: Jan. 23, 2024

(54) SYSTEMS AND METHODS FOR INSECT DETECTION

(71) Applicant: Prince Mohammad Bin Fahd University, Dhahran (SA)

(72) Inventors: Sadiq Ali Alhuwaidi, Dhahran (SA); Ahmed Abul Hussain, Dhahran (SA); Shuruq Fallatah, Dhahran (SA); Razan Alzaben, Dhahran (SA); Haneen Quraishi, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 18/192,193

(22) Filed: Mar. 29, 2023

(51) Int. Cl.
*A01M 1/02* (2006.01)
*A01M 1/10* (2006.01)
*A01M 1/04* (2006.01)

(52) U.S. Cl.
CPC .............. *A01M 1/026* (2013.01); *A01M 1/04* (2013.01); *A01M 1/10* (2013.01); *A01M 1/103* (2013.01); *A01M 2200/01* (2013.01)

(58) Field of Classification Search
CPC .......... A01M 1/026; A01M 1/04; A01M 1/10; A01M 2200/01; A01M 1/103
See application file for complete search history.

(56) References Cited

U.S. PATENT DOCUMENTS

| 5,253,450 | A  | * | 10/1993 | Muramatsu | ............. | A01M 1/02 |
| | | | | | | 43/107 |
| 9,585,376 | B2 | * | 3/2017 | Park | ....................... | A01N 61/00 |
| 10,152,035 | B2 | * | 12/2018 | Reid | ........................ | A01M 1/20 |
| 2009/0199457 | A1 | * | 8/2009 | Grigorov | .............. | A01M 1/026 |
| | | | | | | 43/99 |

(Continued)

FOREIGN PATENT DOCUMENTS

| CN | 103598171 A | 2/2014 |
| CN | 209403362 U | 9/2019 |

(Continued)

OTHER PUBLICATIONS

Michele Preti, et al., "Insect pest monitoring with camera-equipped traps: strengths and limitations", Journal of Pest Science, vol. 94, Dec. 4, 2020, pp. 203-217.

*Primary Examiner* — Darren W Ark
*Assistant Examiner* — Katelyn T Truong
(74) *Attorney, Agent, or Firm* — Oblon, McClelland, Maier & Neustadt, L.L.P.

(57) ABSTRACT

An insect detection system includes a plurality of traps comprising an attraction source, a communication module, a motion sensor, and one or more environmental sensors. The insect detection system includes a plurality of accelerometers configured to measure vibrations in a tree and is electronically coupled with at least one of the plurality of traps, and one or more power controllers, where each of the power controllers supplies electrical energy to one or more traps and one or more accelerometers. The insect detection system includes a server computer having a processor and a computer readable medium, wherein the server computer is in communication with each trap of the plurality of traps and is configured to receive environmental data from each of the plurality of traps and vibration data from each of the plurality of accelerometers.

6 Claims, 14 Drawing Sheets

(56) References Cited

U.S. PATENT DOCUMENTS

| | | | |
|---|---|---|---|
| 2009/0300968 A1* | 12/2009 | Zajac | A01M 1/2011 |
| | | | 43/132.1 |
| 2011/0289822 A1* | 12/2011 | Duehl | A01M 1/103 |
| | | | 43/121 |
| 2013/0199082 A1* | 8/2013 | Haik | A01M 1/02 |
| | | | 43/132.1 |
| 2014/0283435 A1* | 9/2014 | Galeb | A01M 25/004 |
| | | | 43/107 |
| 2015/0216158 A1* | 8/2015 | Mizrach | A01M 1/026 |
| | | | 43/107 |
| 2015/0351336 A1* | 12/2015 | Gilbert | H04L 67/125 |
| | | | 700/284 |
| 2019/0104715 A1* | 4/2019 | Ben Hamozeg | G08C 17/02 |
| 2020/0229420 A1* | 7/2020 | Ben Hamozeg | G01G 19/42 |
| 2020/0236920 A1* | 7/2020 | Fages | A01M 23/005 |
| 2022/0046907 A1 | 2/2022 | Jaffrey | |
| 2022/0061301 A1* | 3/2022 | Smith | A01M 1/106 |

FOREIGN PATENT DOCUMENTS

| | | |
|---|---|---|
| CN | 213369067 U | 6/2021 |
| WO | WO 2022/158971 A1 | 7/2022 |

\* cited by examiner

SYSTEMS AND METHODS FOR INSECT DETECTION

BACKGROUND

Technical Field

The present disclosure is directed to systems and methods for insect detection. In particular, the present disclosure is directed to Internet of things (IoT)-based red palm weevil detection and tracking systems and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Insect pests cost billions of dollars every year in the form of crop losses. Red palm weevils are major invasive pests that affect different species of palm trees around the world, including date, oil palm, and coconut trees. Red palm weevils have been detected in more than sixty countries and have caused significant economic losses in those countries. These pests are extremely difficult to detect in the early stage of infestation. It is often too late to save a tree once red palm weevil infestation symptoms become visible. Early detection of infestation is essential in tackling and eliminating the threat posed by these pests. A number of techniques have been employed to detect infestation by the red palm weevils at an early stage. However, existing techniques are not efficient and require human intervention.

Accordingly, it is one object of the present disclosure to provide systems and methods for early detection of insect infestation in an automatic and efficient manner.

SUMMARY

In an exemplary embodiment, an insect detection system is disclosed. The insect detection system includes a plurality of traps comprising an attraction source, a communication module, a motion sensor, and one or more environmental sensors. The insect detection system further includes a plurality of accelerometers configured to measure vibrations of a tree and electronically coupled with at least one of the plurality of traps. The insect detection system also includes one or more power controllers. Each one of the power controllers supplies electrical energy to one or more traps and one or more accelerometers. Further, the insect detection system includes a server computer comprising a processor and a computer readable medium. The server computer is in communication with each trap of the plurality of traps and configured to receive environmental data from each of the plurality of traps and vibration data from each of the plurality of accelerometers.

In another exemplary embodiment, an insect detection method is disclosed. The insect detection method includes deploying a trap comprising an attraction source, a communication module, a motion sensor, and one or more environmental sensors and an accelerometer near a tree. The insect detection method further includes counting, using the motion sensor of the trap, a count of insects entering the trap, and measuring, using the accelerometer, acceleration data of vibrations in the tree. Further, the insect detection method includes, in response to the number of insects exceeding a threshold number, transmitting, by the communication module of the trap to a server computer, an area infestation message comprising environmental data measured by the one or more environmental sensors, a trap location and the count of insects entering the trap. The insect detection method also includes, in response to acceleration data measured by the accelerometer within a predetermined range of acceleration values, transmitting, by the communication module of the trap to the server computer, a tree infestation message comprising the acceleration data, and a tree location identifier.

In yet another exemplary embodiment, a truncated cone-shaped trap is disclosed. The truncated cone-shaped trap includes a funnel-shaped conduit, an attraction source, and a motion sensor configured to detect and count insects entering the funnel-shaped conduit. The truncated cone-shaped trap also includes one or more environmental sensors configured to measure at least temperature and humidity. Further, the truncated cone-shaped trap includes a processor and a communication module coupled to the processor configured to receive acceleration data from an accelerometer, and to transmit the count of insects, the temperature, the humidity, and the acceleration data to a server computer.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
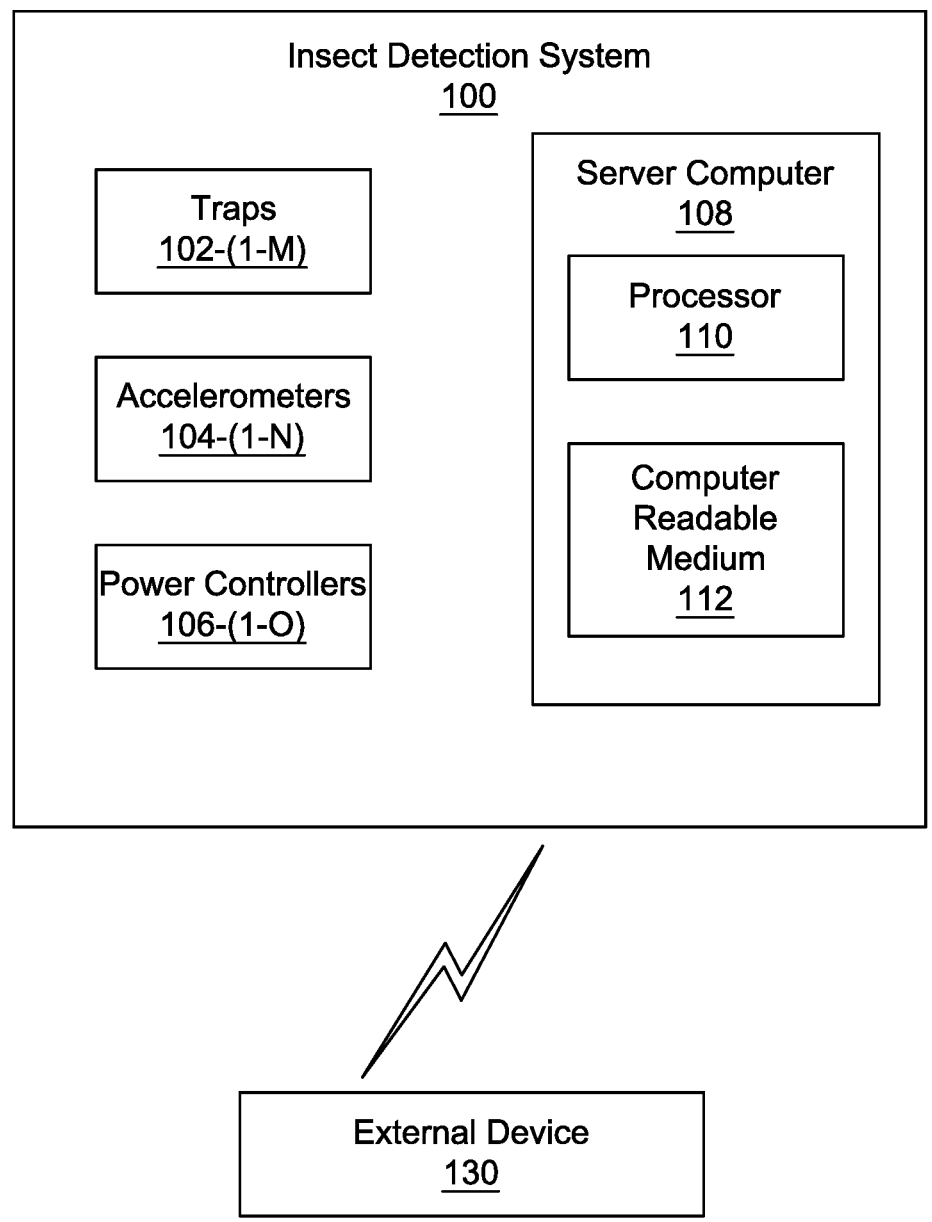
FIG. 1 shows a block diagram of an insect detection system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to systems and methods for insect detection. The present disclosure aims at detecting insects (for example, red palm weevils) at the earliest stage of infestation using an Internet of things (IoT)-based system. The IoT-based system can operate automatically and effectively thereby assisting in the early detection of the insect infestation.

FIG. 1 illustrates a block diagram of an insect detection system 100, according to certain embodiments.

According to aspects of the present disclosure, the insect detection system 100 may be employed in an area (for example, a farm) that has a large number of palm trees. Examples of palm trees include, but are not limited to, date, oil palm, and coconut trees. The insect detection system 100 is configured to detect insects (for example, red palm weevils) at the earliest stage of infestation in a palm tree farm. The description hereinafter is explained with reference to palm trees and red palm weevils only for the purpose of explanation, it should not be construed as a limitation, and it is well appreciated that the present disclosure may also be applicable to any other types of trees and insects.

The insect detection system 100 includes a plurality of traps 102-(1-M), a plurality of accelerometers 104-(1-N), one or more power controllers 106-(1-O), and a server computer 108, such that there is a total of M traps, N accelerometers, and 0 power controllers. The plurality of traps 102-(1-M) and the plurality of accelerometers 104-(1-N) are placed at strategic locations across a palm tree farm to cover the palm tree farm area. The server computer 108 is in communication with each trap of the plurality of traps 102-(1-M). The server computer 108 includes a processor 110 and a computer readable medium 112. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 may be configured to fetch and execute computer-readable instructions. The insect detection system 100 is remotely connected to an external device 130. The external device 130 may be any device used by a user. The user may be a farmer, an owner of the palm tree farm, or any person associated with the palm tree farm. The external device 130 may be any computing device, such as a desktop computer, a laptop, a tablet computer, a mobile device, or any other computing device.

According to an implementation, each of the plurality of traps 102-(1-M) is configured to count insects that enter the trap. Each of the plurality of traps 102-(1-M) may be configured to measure environmental data. The manner in which the plurality of traps 102-(1-M) count the insects that enter the plurality of traps 102-(1-M) and measure the environmental data is described in detail later in the description. In one implementation, each of the plurality of traps 102-(1-M) stores a trap location identifier that identifies the geographic location of the trap.

In an implementation, the plurality of accelerometers 104-(1-N) are connected to palm trees, such that each of the plurality of accelerometers 104-(1-N) is connected to a corresponding single palm tree. In examples, the plurality of accelerometers 104-(1-N) may be connected to the trunks of the palm trees. The plurality of accelerometers 104-(1-N) is configured to measure vibrations in the palm trees. In some examples, the pests such as red palm weevil, may cause a defined range of vibrations that is detected by the accelerometer. Other pests too may be identified based on the vibrating aspect. The measured vibrations may be referred to as vibration data or acceleration data. The plurality of accelerometers 104-(1-N) are electronically coupled with at least one of the plurality of traps 102-(1-M). Each of the plurality of accelerometers 104-(1-N) store a tree location identifier that identifies the geographic location of the tree. In examples, each of the plurality of accelerometers 104-(1-N) may be a 3-Axis digital accelerometer.

In one example, each of the one or more power controllers 106-(1-O) supplies electrical energy to one or more of the plurality of traps 102-(1-M) and one or more of the plurality of accelerometers 104-(1-N). In examples, each of the one or more power controllers 106-(1-O) includes a solar panel (not shown in FIG. 1) for supplying electrical energy.

The server computer 108 is configured to receive environmental data from each of the plurality of traps 102-(1-M) and vibration data from each of the plurality of accelerometers 104-(1-N). The computer readable medium 112 of the server computer 108 includes instructions, executable by the processor 110, that cause the processor 110 to perform a method. The method includes receiving, by the server computer 108 from one or more of the plurality of traps 102-(1-M), a trap location identifier, a count of insects that entered the trap, and environmental data. Further, the method includes determining if the count of insects that entered the one or more of the plurality of traps 102-(1-M) exceeds a threshold number, transmitting, by the server computer 108 to the external device 130, an area infestation notification message comprising the environmental data, the trap location identifier, and the count of insects. The area infestation notification message may be of any appropriate format. For example, the area infestation notification message may be an email message, a text message, short message service (SMS) message, or any other type of message.

In some embodiments, the computer readable medium 112 of the server computer 108 includes instructions, executable by the processor 110, that cause the processor 110 to perform another method. The method includes receiving, by the server computer 108 from one or more of the plurality of accelerometers 104-(1-N) via the communication module (not shown in FIG. 1) of a connected trap, a tree location identifier and acceleration data of vibrations in the tree (i.e., the vibration data). The method further includes based on if the acceleration data corresponds to a predetermined range of acceleration values, transmitting, by the server computer 108 to the external device 130, a tree infestation message comprising the tree location identifier. The tree infestation message may be of any appropriate format. For example, the tree infestation message may be an email message, a text message, SMS message, or any other type of message. Thus, the server computer 108 sends the information to update the user of the external device 130 whom is then able to read the data remotely. According to aspects of the present disclosure, the insect detection system 100 identifies and estimates the infected area within a radius of 25 meters. The insect detection system 100 informs the user about the number of insects inside the traps 102-(1-M) without an onsite visit and helps reduce infestation in palm tree farms.

In some aspects of the present disclosure, a client-side application (hereinafter referred to as application) associated with the server computer 108, may be installed in the external device 130. The application may allow the server computer 108 to transmit the area infestation notification message and the tree infestation message to the external device 130.

Figure 2:
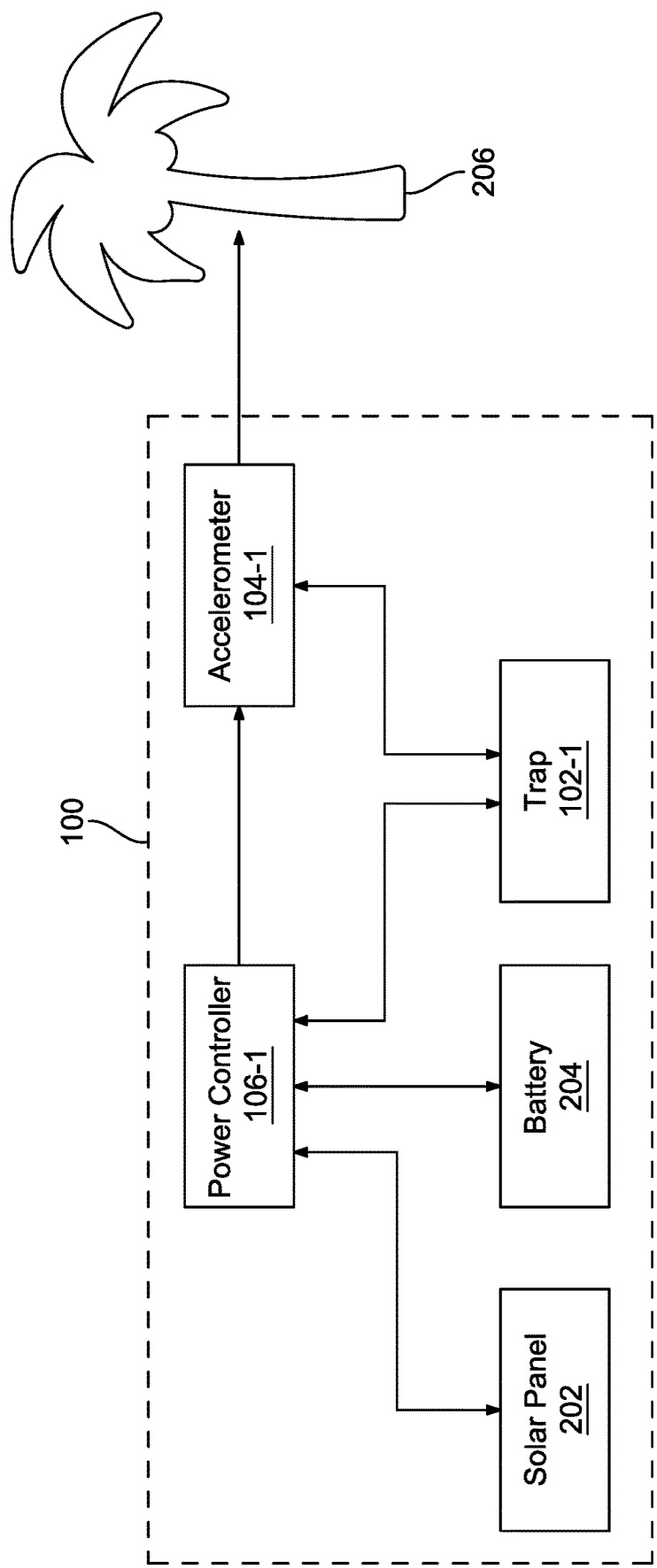
FIG. 2 illustrates an example of the insect detection system, according to certain embodiments.

FIG. 2 illustrates an example of the insect detection system 100, according to certain embodiments.

As shown in FIG. 2, the insect detection system 100 includes a trap 102-1, an accelerometer 104-1, a power controller 106-1, a solar panel 202, and a battery 204. Although the solar panel 202 is shown external to the power controller 106-1, in some implementations, the solar panel 202 may be implemented within the power controller 106-1 (i.e., the power controller 106-1 includes the solar panel 202). As shown in FIG. 2, the accelerometer 104-1 of the insect detection system 100 is electronically coupled with a tree 206. In examples, the tree 206 may be a palm tree. The power controller 106-1 is electronically connected to the trap 102-1 and the accelerometer 104-1. Further, the accelerometer 104-1 is electronically coupled with the trap 102-1. The solar panel 202 supplies electrical energy to the trap 102-1 and the accelerometer 104-1. In an implementation, the power controller 106-1 may can store and distribute electrical energy to the trap 102-1 and the accelerometer 104-1. The solar panel 202 can be used by the power controller 106-1 to obtain and store electrical energy in the battery 204.

Figure 3:
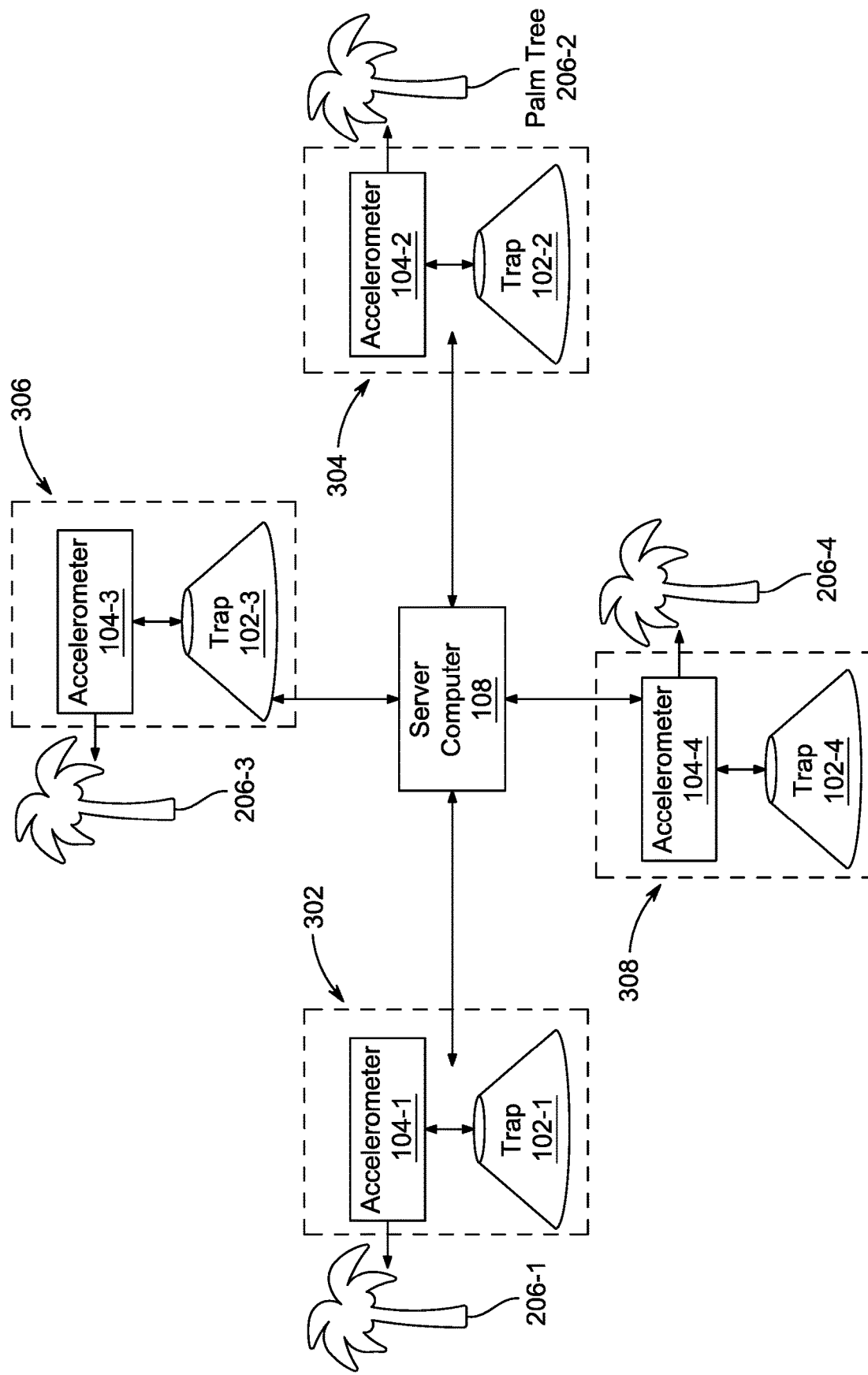
FIG. 3 shows various subsystems of the insect detection system, according to certain embodiments.

FIG. 3 shows various subsystems of the insect detection system 100, according to certain embodiments.

FIG. 3 shows four traps including a first trap 102-1, a second trap 102-2, a third trap 102-3, and a fourth trap 102-4, four accelerometers including a first accelerometer 104-1, a second accelerometer 104-2, a third accelerometer 104-3, and a fourth accelerometer 104-4, four trees including a first tree 206A, a second tree 206B, a third tree 206C, and a fourth tree 206D, and a server computer 108. The first accelerometer 104-1 is electronically coupled with the first trap 102-1 and the first tree 206A. The first accelerometer 104-1 and the first trap 102-1 are collectively referred to as a first subsystem 302. The second accelerometer 104-2 is electronically coupled with the second trap 102-2 and the second tree 206B. The second accelerometer 104-2 and the second trap 102-2 are collectively referred to as a second subsystem 304. The third accelerometer 104-3 is electronically coupled with the third trap 102-3 and the third tree 206C. The third accelerometer 104-3 and the third trap 102-3 are collectively referred to as a third subsystem 306. The fourth accelerometer 104-4 is electronically coupled with the fourth trap 102-4 and the fourth tree 206D. The fourth accelerometer 104-4 and the fourth trap 102-4 are collectively referred to as a fourth subsystem 308. The first subsystem 302, the second subsystem 304, the third subsystem 306, and the fourth subsystem 308 are electronically coupled with the server computer 108.

Although one trap and one accelerometer are shown in each subsystem, in some implementations, each subsystem may include a plurality of traps and a plurality of accelerometers spread around a palm tree farm. In an implementation, each of the plurality of traps and each of the plurality of accelerometers may store respective location identifiers which can be used to locate their positions in the palm tree farm.

Figure 4:
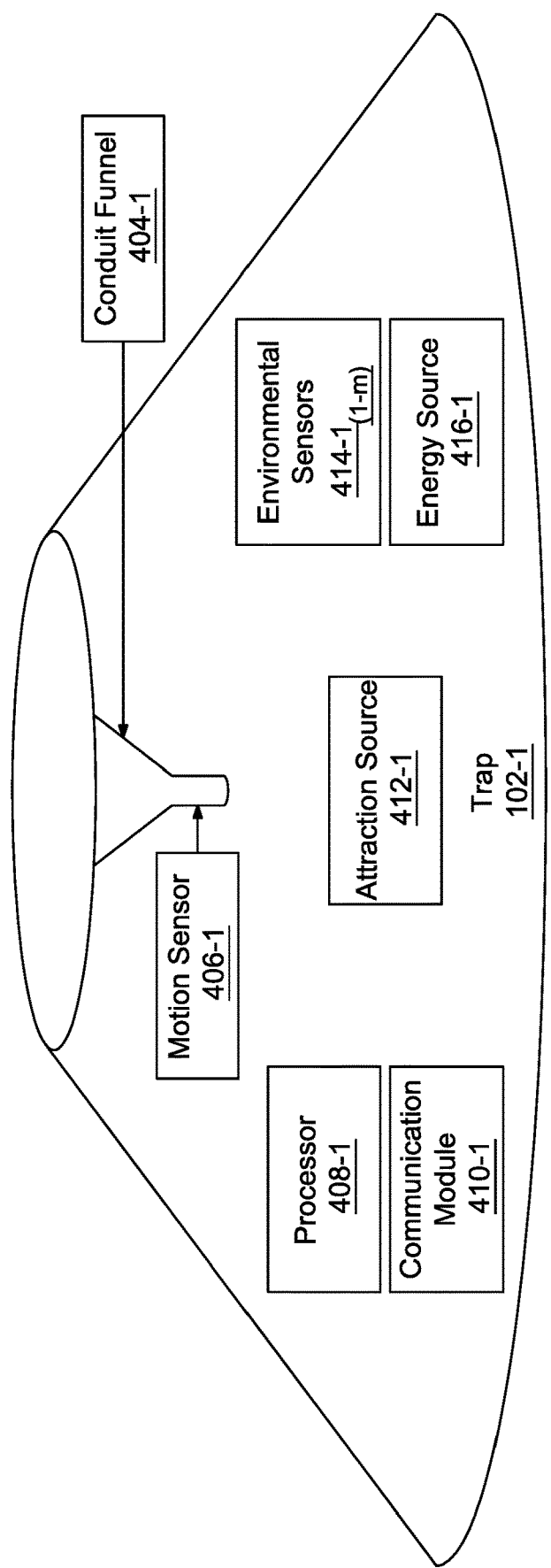
FIG. 4 illustrates a trap of the insect detection system, according to certain embodiments.

FIG. 4 illustrates the trap 102-1 of the insect detection system 100, according to certain embodiments.

According to aspects of the present disclosure, the trap 102-1 is a truncated cone-shaped trap. The trap 102-1 may interchangeably be referred to as truncated cone-shaped trap 102-1. The trap 102-1 may be a three-dimensional (3-D) funnel. The trap 102-1 is designed to control the entry of insects inside the trap 102-1 and count the number of insects entering the trap 102-1. In examples, the trap 102-1 assists in accurately estimating the number of red palm weevils within a specified area. The trap 102-1 may be electronically coupled to an accelerator (not shown in FIG. 1). The trap 102-1 and the accelerometer may be deployed near a tree (for example, a palm tree). The accelerator is configured to measure acceleration data of vibrations in the tree.

The trap 102-1 may include a funnel-shaped conduit 404-1 (interchangeably referred to as conduit funnel 404-1) and a motion sensor 406-1. The funnel-shaped conduit 404-1 lets only one insect into the trap 102-1 at a time. The motion sensor 406-1 is configured to detect and count insects entering the funnel-shaped conduit 404-1. The motion sensor 406-1 may be an active microwave sensor, an IR sensor such as break beam sensor, or other any other suitable sensor that can detect motion.

In a preferable embodiment of the disclosure the funnel-shaped conduit 404-1 includes two portions. As shown in FIG. 4, a first, upper funnel portion slopes evenly downwards towards a lower tube portion. The tube portion has a length that is preferably shorter than the height of the funnel portion as measured by a horizontal parallel to the outer wall of the tube portion from a narrowest point of the funnel portion to a plane defined by the widest portion of the funnel portion. Preferably the tube portion has a length that is substantially less than the height of the funnel portion. For example, the tube portion has a length that is less than ½ the height of the funnel portion, more preferably less than ¼ the height of the final portion. A short tube portion encourages quick entry of insects through the funnel conduit and irreversible entry to the interior of the trap. Even more preferably, the funnel portion is made of a cellulose—based material such as compressed palm frond or compressed palm fiber. The terminal face of the tube portion is preferably flat.

Preferably, a spectrophotometer detector is mounted proximal to the terminal face of the tube portion of the conduit funnel. A light source such as a plurality of LEDs operating in the visible range is mounted along the circumference of the conduit funnel at one or more funnel heights. The visible light source is configured to shine downwardly towards the terminal face of the tube portion of the funnel conduit. A spectrophotometer sensor mounted proximal to the terminal end of the tunnel portion is oriented away from the light source mounted on the wall of the funnel portion of the funnel conduit. As an insect enters the conduit funnel and passes through the terminal end, especially in the case of weevils and beetles, the exoskeleton of the insect reflects visible light shining from the visible light source. The spectrophotometer records the visible light reflectance that occurs upon entry of each insect to the interior of the trap. Particular occurrences of inset entry into the trap are detected as anomalies in the signal of the spectrophotometer detector, e.g., each signal anomaly identifies a point in time at which an insect entered the conduit funnel and passed through the tunnel portion to the interior of the trap. Each of these disruptions in the background signal of the spectrophotometer may be used as a basis for insect counting.

Referring again to FIG. 4, the trap 102-1 further includes a processor 408-1 and a communication module 410-1 coupled to the processor 408-1. The processor 408-1 may be implemented as one or more microprocessors, microcomputers, microcontrollers, digital signal processors, central processing units, state machines, logic circuitries, and/or any devices that manipulate signals based on operational instructions. Among other capabilities, the processor 408-1 may be configured to fetch and execute computer-readable instructions. The processor 408-1 and the communication module 410-1 allows the trap 102-1 to be monitored remotely. The communication module 410-1 may include an antenna and software that allow the trap 102-1 to communicate with external devices over physical and network connections, such as other traps (for example, traps 102-(2-M), accelerometers (for example, accelerometer 104-(1-N), power controllers (for example, the power controllers 106-(1-O)), or the server computer (for example, the server computer 108).

The trap 102-1 also includes an attraction source 412-1. The attraction source 412-1 may include a pheromone source, a light source, a sound source, or any suitable insect attractant. In examples, the attraction source 412-1 is configured to attract red palm weevils and other pests. The red palm weevils may be attracted by the pheromone smell inside the trap 102-1. The trap 102-1 further includes one or more environmental sensors $414-1_{(1-m)}$ configured to measure at least temperature and humidity inside the trap 102-1. In an implementation, each of the one or more environmental sensors $414-1_{(1-m)}$ may include at least a thermometer configured to measure a temperature inside the trap 102-1 and a hygrometer configured to measure a humidity inside the trap 102-1. The trap 102-1 also includes an energy source 416-1. The energy source 416-1 may be battery.

The communication module 410-1 may be utilized to send the information in order to update a user with the presence of insects. The communication module 410-1 is configured to receive acceleration data from the accelerometer. The communication module 410-1 is further configured to transmit the count of insects, the temperature, the humidity, and the acceleration data to a server computer (for example, the server computer 108). Accordingly, a palm tree may be tested for presence of red palm weevils and their larvae by measuring their vibrations. In examples, the vibration data or acceleration data is collected for further processing and analysis which helps in detecting the level of infestation of the palm tree.

According to an implementation, the communication module 410-1 is further configured to store a trap location identifier that identifies the geographic location of the trap 102-1. In an implementation, the communication module 410-1 is configured to transmit an area infestation notification message comprising a count of insects that entered the trap 102-1 to the server computer 108. The trap 102-1 further includes a computer readable medium including instructions, executable by the processor 408-1, that cause the processor 408-1 to perform a method. The method includes upon the motion sensor 406-1 detecting an insect entering the trap 102-1, increasing a count of insects entering the trap 102-1. The method further includes comparing the current count of insects to a threshold number, and based on if the current count of insects exceeds the threshold number, transmitting, by the communication module 410-1 of the trap 102-1 to the server computer 108, an area infestation message comprising environmental data measured by the one or more environmental sensors $414-1_{(1-m)}$, a trap location, and the count of insects entering the trap 102-1.

The trap 102-1 further includes a computer readable medium comprising instructions, executable by the processor 408-1, that cause the processor 408-1 to perform a method. The method includes receiving, from the accelerometer, acceleration data of the vibrations. The method further includes determining that the acceleration data is within a predetermined range of acceleration values and transmitting, by the communication module 410-1 of the trap 102-1 to the server computer 108, a tree infestation message comprising the acceleration data, and a tree location identifier. According to an implementation, other traps 102-(2-M) may be similar to the trap 102-1.

According to aspects of the present disclosure, the trap 102-1 and the accelerometer 104-1 are deployed near a tree. The motion sensor 406-1 of the trap 102-1 is configured to count number of insects entering the trap 102-1. The one or more environmental sensors $414-1_{(1-m)}$ measures environmental data. The accelerometer 104-1 measures acceleration data of vibrations in the tree. If the number of insects that entered the trap 102-1 exceeds a threshold number, then the communication module 410-1 of the trap 102-1 transmits an area infestation message comprising the environmental data, a trap location of the trap 102-1, and the count of insects entering the trap 102-1 to the server computer 108. The trap location may be stored in the communication module 410-1. Further, if the acceleration data measured by the accelerometer 104-1 is within a predetermined range of acceleration values, the communication module 410-1 of the trap 102-1 transmits a tree infestation message comprising the acceleration data and a tree location identifier to the server computer 108. The tree location identifier may be stored in the accelerometer 104-1.

Figure 5:
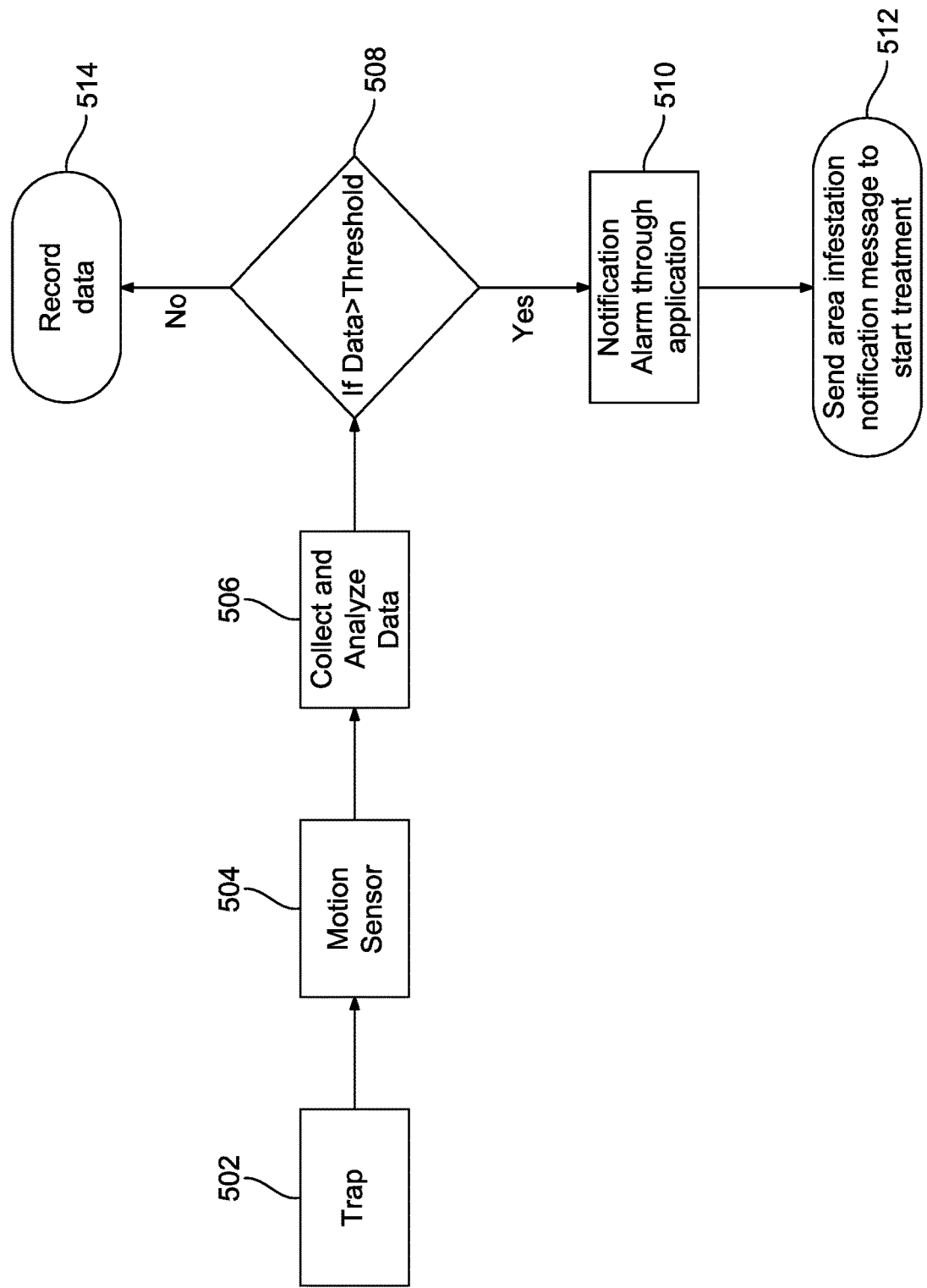
FIG. 5 illustrates an exemplary insect monitoring logic of the trap, according to certain embodiments.

FIG. 5 illustrates an exemplary insect monitoring logic of the trap 102-1, according to certain embodiments.

As shown in the example of FIG. 5, at step 502, one or more insects enters the trap 102-1.

At step 504, the motion sensor 406-1 of the trap 102-1 detects and counts insects entering the trap 102-1.

At step 506, the communication module 410-1 of the trap 102-1 collects data regarding the count of insects entering the trap 102-1 and analyzes the data.

At step 508, the communication module 410-1 compares the current count of insects to a threshold number. Based on if the current count of insects exceeds the threshold number, the communication module 410-1 sends the count of insects entering the trap 102-1 to the server computer 108. In examples, the threshold number may be two (2).

At step 510, based on if the count of insects that entered the trap 102-1 exceeds the threshold number, the server computer 108 triggers a notification alarm through an application. In examples, the threshold number may be two (2). If the current count of insects is more than 2, then the server computer 108 may trigger a notification alarm through the application.

At step 512, the server computer 108 transmits an area infestation notification message comprising the count of insects to the external device 130. In examples, the server computer 108 transmits an area infestation notification message through the application. In an implementation, the user of the external device 130 may start appropriate treatment upon receiving the area infestation notification message. As it appears from FIG. 5, if the count of red palm weevils has exceeded the threshold, the user of the external device 130 will have clear information whether it needs an urgent treatment or not.

At step 514, the server computer 108 records or stores the data regarding the count of insects entering the trap 102-1 for future reference.

Figure 6:
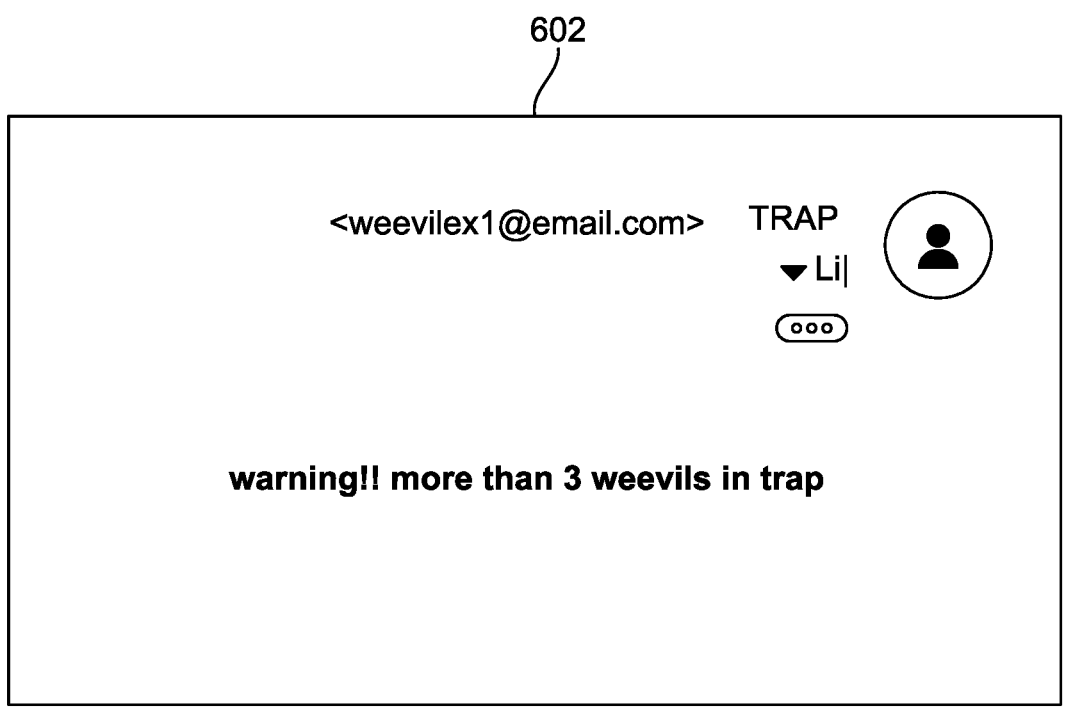
FIG. 6 depicts an exemplary email alert notice transmitted by a server computer to an external device, according to certain embodiments.

FIG. 6 depicts an exemplary email alert notice 602 transmitted by the server computer 108 to the external device 130, according to certain embodiments.

In an implementation, if the current count of insects in the trap 102-1 is more than two, then the server computer 108 may transmit the email alert notice 602 to the external device 130. The email alert notice 602 indicates that more than three red palm weevils have entered the trap 102-1.

Figure 7A:
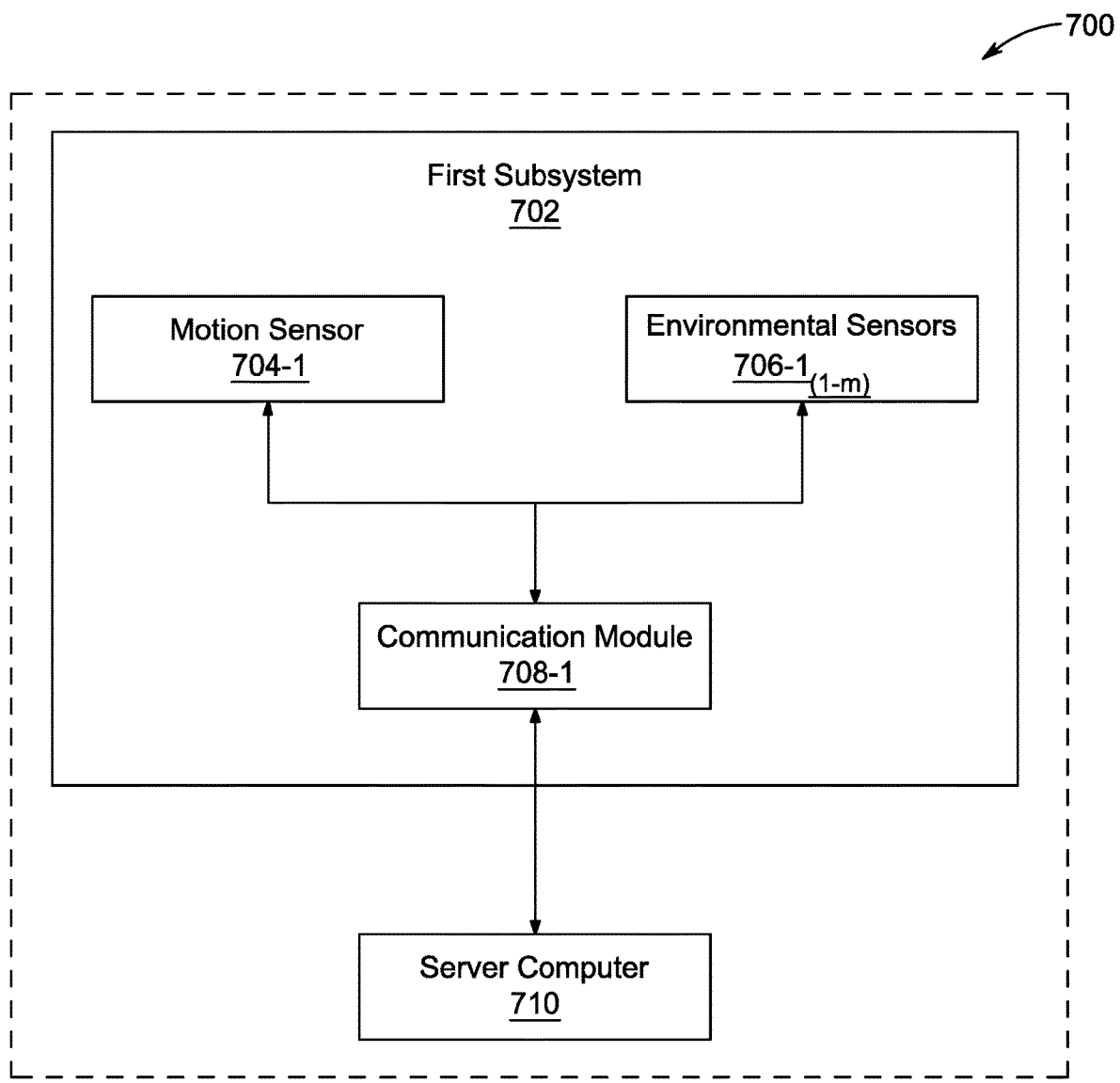
FIG. 7A illustrates a first subsystem of the insect detection system, according to certain embodiments.

FIG. 7A illustrates a first subsystem 702 of an insect detection system 700, according to certain embodiments.

As shown in FIG. 7A, the first subsystem 702 includes a motion sensor 704-1, environmental sensors 706-1$_{(1-m)}$, and a communication module 708-1. The first subsystem 702 is connected to a server computer 710. In examples, the motion sensor 704-1, the environmental sensors 706-1$_{(1-m)}$, and the communication module 708-1 may be components of a trap (not shown in FIG. 7A) and the trap may be a part of the insect detection system 700. In examples, the trap may be an example of the trap 102-1.

The first subsystem 702 may an example of the first subsystem 302 of the insect detection system 100, the motion sensor 704-1 may an example of the motion sensor 406-1 of the trap 102-1, the environment sensors 706-1$_{(1-m)}$ may an example of the environment sensors 414-1$_{(1-m)}$ of the trap 102-1, the communication module 708-1 may an example of the communication module 410-1 of the trap 102-1, and the server computer 710 may be an example of the server computer 108 of the insect detection system 100.

Figure 7B:
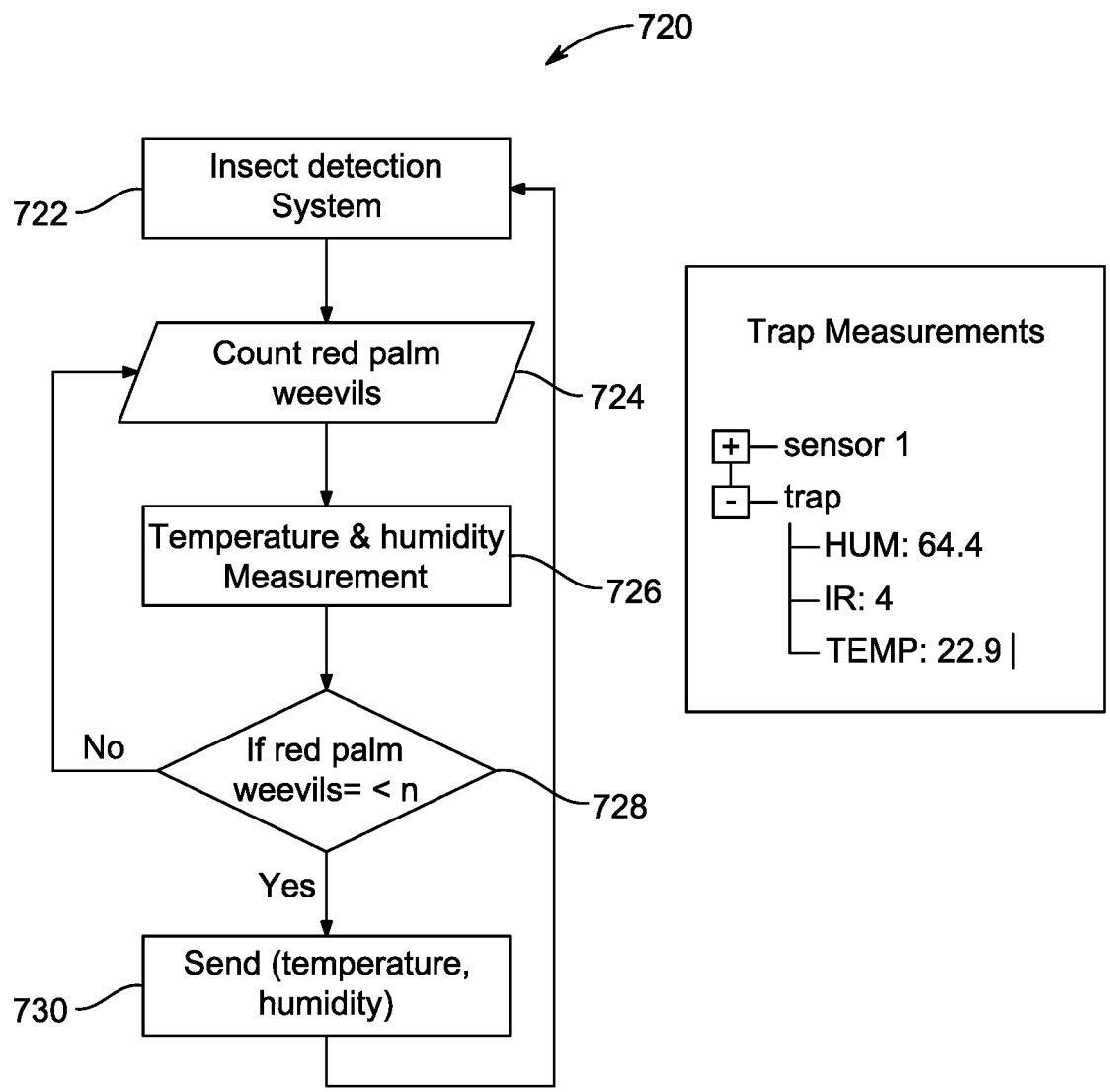
FIG. 7B illustrates an exemplary flowchart for red palm weevils' detection inside the trap, according to certain embodiments.

FIG. 7B illustrates an exemplary flowchart 720 for red palm weevils' detection inside a trap, according to certain embodiments.

At step 722 of the flowchart 720, the insect detection system 100 may be deployed in a palm tree farm.

At step 724 of the flowchart 720, the motion sensor 704-1 of the trap may count red palm weevils entering the trap.

At step 726 of the flowchart 720, the environmental sensors 706-1$_{(1-m)}$ of the trap may measure temperature and humidity inside the trap.

At step 728 of the flowchart 720, the current count of the red palm weevils inside the trap may be compared to a threshold number "n". If the count of the red palm weevils is equal to or less than the threshold number "n", then the communication module 708-1 of the trap may send the count of red palm weevils, the temperature, and the humidity to the server computer 710 (step 730 of the flowchart 720). If the count of the red palm weevils is not equal to or less than the threshold number "n", then the motion sensor 704-1 continues counting the red palm weevils entering the trap (step 724 of the flowchart 720).

Figure 8A:
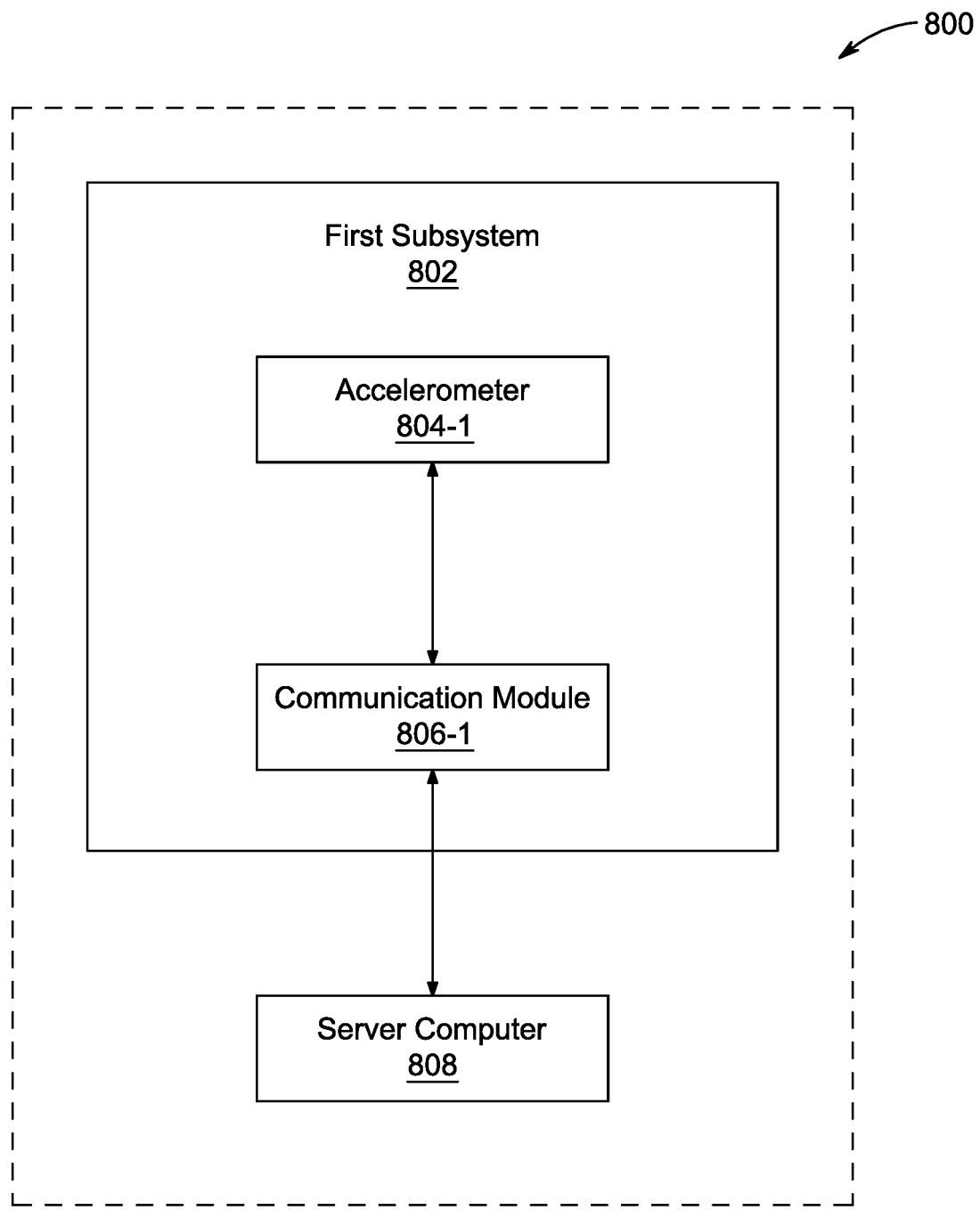
FIG. 8A illustrates the first subsystem of the insect detection system, according to certain embodiments.

FIG. 8A illustrates a first subsystem 802 of an insect detection system 800, according to certain embodiments.

As shown in FIG. 8A, the first subsystem 802 includes an accelerometer 804-1 and a communication module 806-1. The first subsystem 802 is connected to a server computer 808. In examples, the communication module 806-1 may be a component of a trap (not shown in FIG. 8A), and the trap may be a part of the insect detection system 800. In examples, the trap may be an example of the trap 102-1.

The first subsystem 802 may be an example of the first subsystem 302 of the insect detection system 100, the accelerometer 804-1 may be an example of the accelerometer 104-1 of the insect detection system 100, the communication module 806-1 may be an example of the communication module 410-1 of the trap 102-1, and the server computer 808 may be an example of the server computer 108 of the insect detection system 100.

Figure 8B:
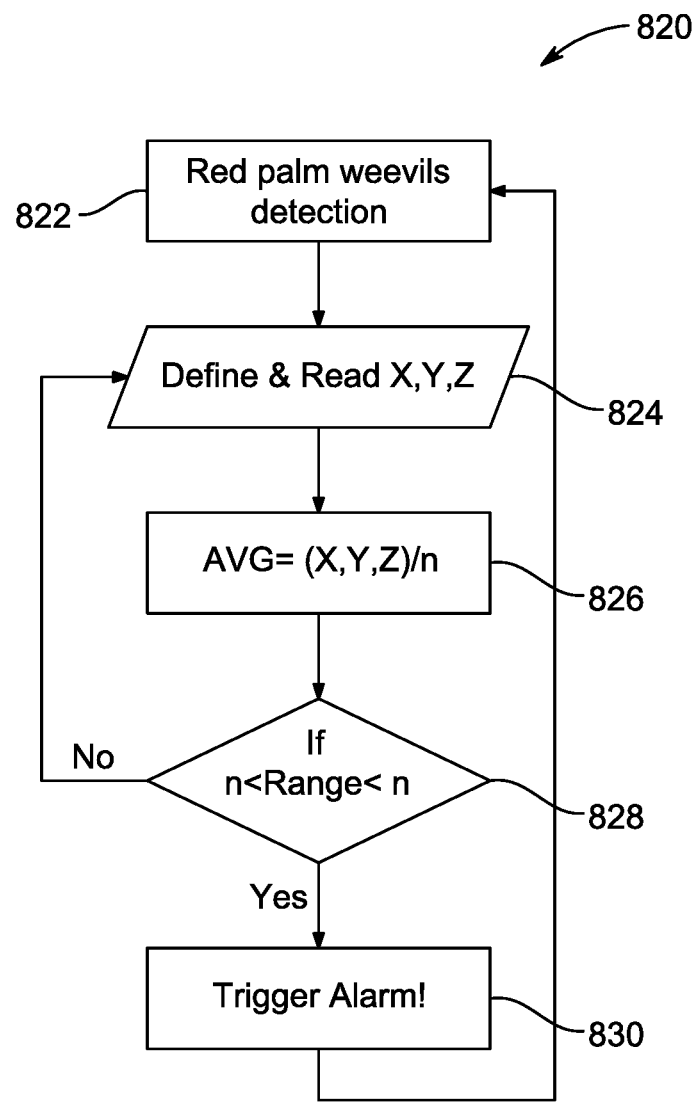
FIG. 8B illustrates an exemplary flowchart for red palm weevil detection on a palm tree, according to certain embodiments.

FIG. 8B illustrates an exemplary flowchart 820 for red palm weevils' detection on a palm tree, according to some embodiments.

At step 822 of the flowchart 820, a process of detecting of red palm weevils on the palm tree begins.

At step 824, the accelerometer 804-1 measures or reads vibration data of the palm tree in X, Y, and Z axes.

At step 826, the average of the vibration data of the palm tree measured in X, Y, and Z axes is calculated.

At step 828, it is determined whether the vibration data corresponds to a predetermined range of vibration values. If the vibration data corresponds to the predetermined range of vibration values, the communication module 806-1 triggers an alarm (step 830 of the flowchart 820). In an example, the communication module 806-1 may transmit a tree infestation message comprising the vibration data to the server computer 808. If the vibration data does not correspond to the predetermined range of vibration values, then the accelerometer 804-1 continues to measure or read the vibration data of the palm tree in X, Y, and Z axes (step 824 of the flowchart 820).

For ease of explanation and understanding, descriptions provided above may be with reference to the trap 102-1, however, the description is equally applicable to one or more of plurality of traps 102-(2-M) and one or more of plurality of accelerometers 104-(2-N).

Figure 9:
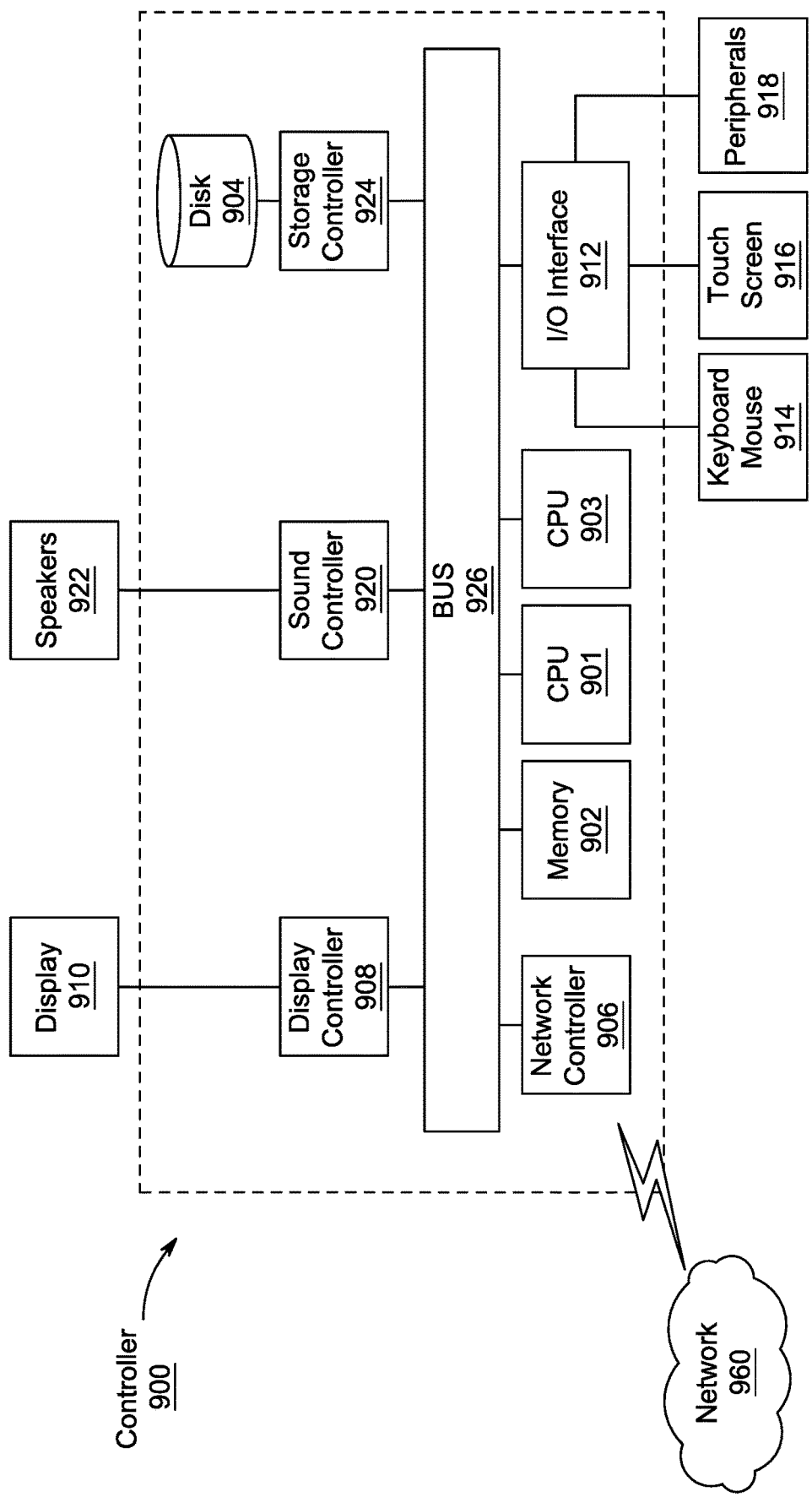
FIG. 9 is an illustration of a non-limiting example of details of computing hardware used in the computing system, according to certain embodiments.

FIG. 9 is an illustration of a non-limiting example of details of computing hardware used in the computing system, according to exemplary aspects of the present disclosure. In FIG. 9, a controller 900 is described which is a computing device (for example, server computer 108 and processor 408) and includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network, such as an LAN or WAN network, or any combination thereof and can also include PSTN or ISDN subnetworks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
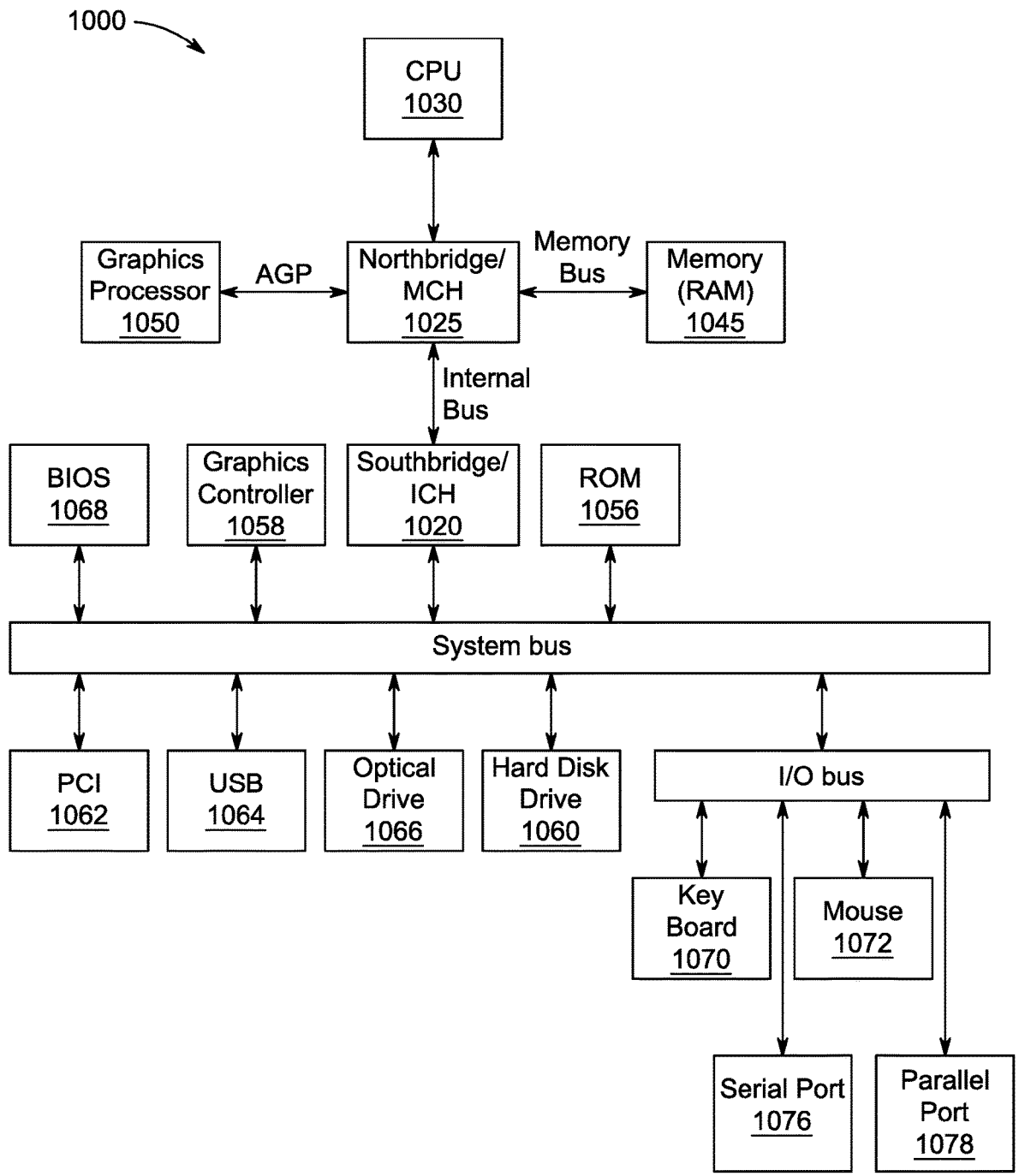
FIG. 10 is an exemplary schematic diagram of a data processing system used within the computing system, according to certain embodiments.

FIG. 10 shows a schematic diagram of a data processing system 1000 used within the computing system, according to exemplary aspects of the present disclosure. The data processing system 1000 is an example of a computer in which code or instructions implementing the processes of the illustrative aspects of the present disclosure may be located.

In FIG. 10, data processing system 1080 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 2045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
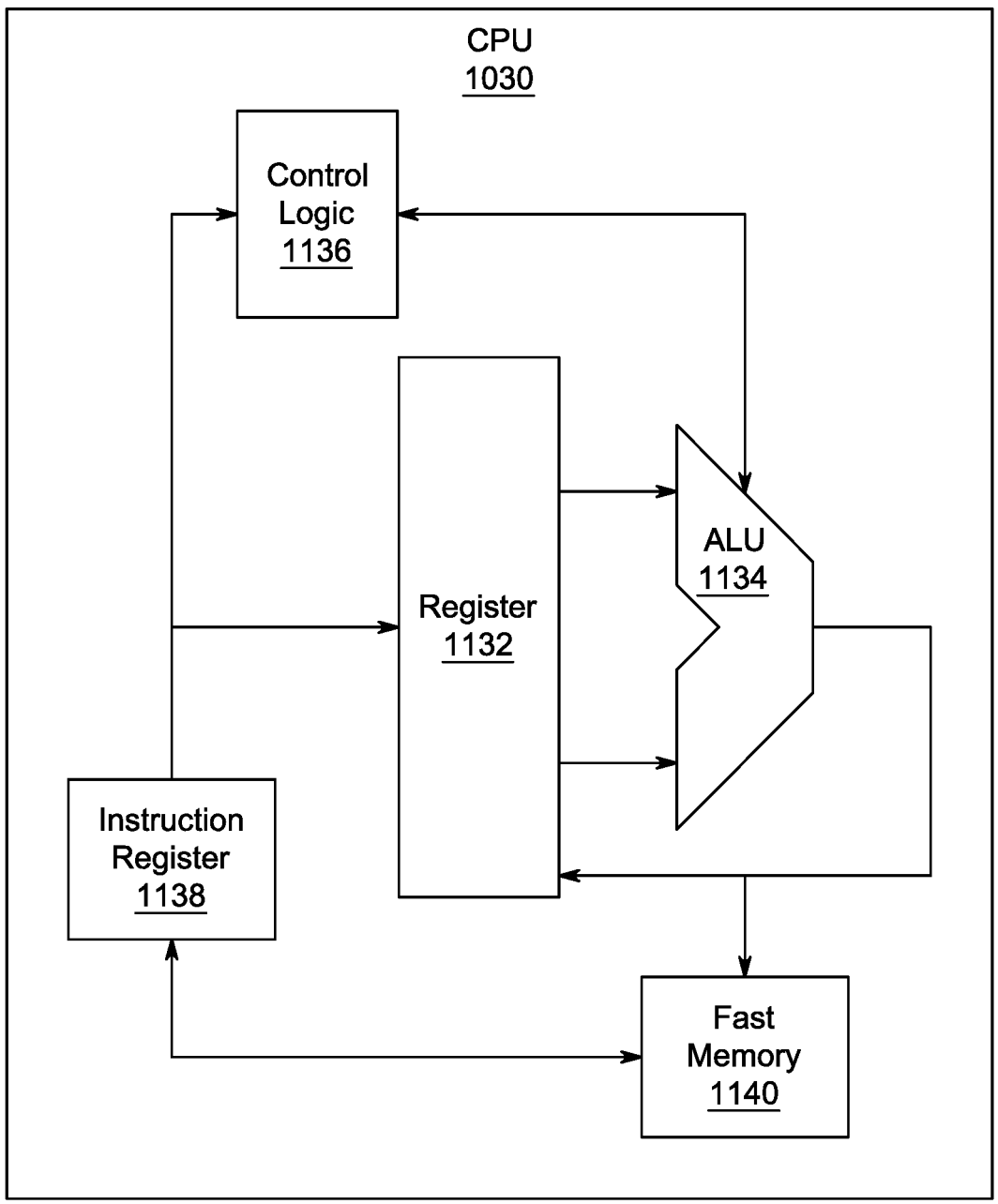
FIG. 11 is an exemplary schematic diagram of a processor used with the computing system, according to certain embodiments.

For example, FIG. 11 shows one aspects of the present disclosure of CPU 1030. In one aspects of the present disclosure, the instruction register 1138 retrieves instructions from the fast memory 1140. At least part of these instructions is fetched from the instruction register 1138 by the control logic 1136 and interpreted according to the instruction set architecture of the CPU 1030. Part of the instructions can also be directed to the register 1132. In one aspects of the present disclosure the instructions are decoded according to a hardwired method, and in another aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain aspects of the present disclosures, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1080 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1020 through a PCI bus 1062.

The PCI devices may include, for example, Ethernet adapters, add-in cards, and PC cards for notebook computers. The Hard disk drive 1060 and CD-ROM 1056 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1060 and optical drive 1066 can also be coupled to the SB/ICH 1020 through a system bus. In one aspects of the present disclosure, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
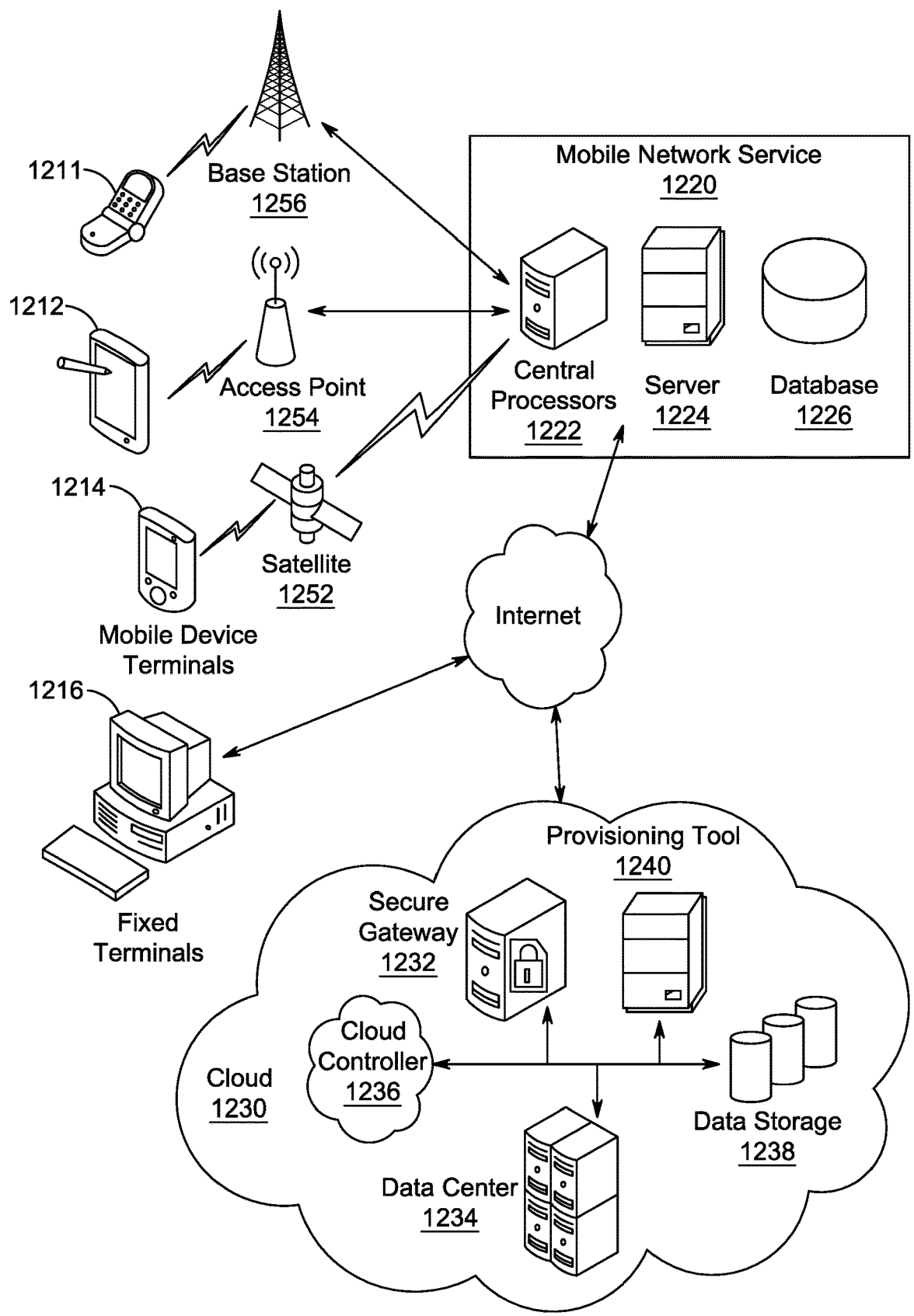
FIG. 12 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). More specifically, FIG. 12 illustrates client devices including a smart phone 1211, a tablet 1212, a mobile device terminal 1214 and fixed terminals 1216. These client devices may be commutatively coupled with a mobile network service 1220 via base station 1256, access point 1254, satellite 1252 or via an internet connection. Mobile network service 1220 may comprise central processors 1222, a server 1224 and a database 1226. Fixed terminals 1216 and mobile network service 1220 may be commutatively coupled via an internet connection to functions in cloud 1230 that may comprise security gateway 1232, data center 1234, cloud controller 1236, data storage 1238 and provisioning tool 1240. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of a corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An insect detection system comprising: a plurality of traps each comprising an attraction source, a communication module, a motion sensor, and one or more environmental sensors;
   a plurality of accelerometers configured to measure vibrations of in a tree and electronically coupled with at least one of the plurality of traps;
   one or more power controllers, wherein each one of the power controllers supplies electrical energy to one or more of the plurality of traps and one or more of the plurality of accelerometers;
   a server computer comprising a processor and a computer readable medium, wherein the server computer is in communication with each trap of the plurality of traps and configured to receive environmental data from each of the plurality of traps and vibration data from each of the plurality of accelerometers,
   wherein for each of the plurality of traps, the motion sensor is configured to detect and count insects entering the trap, the one or more environmental sensors are configured to measure at least temperature and humidity, wherein the communication module is configured to transmit a count of insects, the temperature, and the humidity of the trap to the server computer, and wherein each of the plurality of traps is a truncated cone-shaped trap that further comprises a funnel-shaped conduit,
   wherein the funnel-shaped conduit comprises a funnel portion proximal to a top of the truncated cone-shaped trap and a tube portion beneath the funnel portion, a length of the tube portion being less than a height of the funnel portion, wherein the tube portion is formed of a cellulose material and has a flat terminal end,
   wherein the computer readable medium of the server computer comprises a first set of instructions, executable by the processor, that cause the processor to perform a method including:
      receiving, by the server computer from one or more of the plurality of traps, a trap location identifier, the count of insects that have entered the trap, and the environmental data including the humidity and temperature inside the trap,
      comparing, by the server computer, the count of insects that entered the trap to a threshold number, and
      when the count of insects that entered the trap exceeds the threshold number, transmitting, by the server computer to an external device, an area infestation notification message comprising the environmental data, the trap location identifier, and the count of insects,
   wherein the computer readable medium of the server computer comprises a second set of instructions, executable by the processor, that cause the processor to perform a method including:
      receiving, by the server computer from one or more of the plurality of accelerometers via the communication module of the at least one of the traps to which the one or more accelerometers is electronically coupled with, a tree location identifier, and acceleration data of vibrations in the tree in X, Y, and Z axes,
      comparing, by the server computer, the acceleration data of vibrations in the tree to a predetermined range of acceleration values, and
      when the acceleration data corresponds to the predetermined range of acceleration values, transmitting, by the server computer to an external device, a tree infestation message comprising the tree location identifier, and
   wherein the attraction source of the trap is configured to attract red palm weevils, and
wherein the accelerometers are connected to palm trees.

2. The system of claim 1, wherein the attraction source comprises a pheromone source or a light source.

3. The system of claim 1, wherein the one or more environmental sensors comprise at least a thermometer configured to measure the temperature inside the trap and a hygrometer configured to measure the humidity inside the trap.

4. The system of claim 1, wherein the communication module of the trap is configured to transmit an area infestation notification message comprising the count of insects that entered the trap to the server computer.

5. The system of claim 1, wherein the one or more power controllers comprises a solar panel.

6. The system of claim 1, wherein the threshold number is 2.

* * * * *